(12) United States Patent
Kim et al.

(10) Patent No.: US 11,912,168 B2
(45) Date of Patent: Feb. 27, 2024

(54) APPARATUS FOR CONTROLLING REGENERATIVE BRAKING TORQUE OF AN ELECTRIC VEHICLE AND A METHOD THEREOF

(71) Applicants: HYUNDAI MOTOR COMPANY, Seoul (KR); KIA MOTORS CORPORATION, Seoul (KR)

(72) Inventors: Sang Joon Kim, Seoul (KR); Hui Un Son, Suwon-si (KR); Sung Hoon Yu, Hwaseong-si (KR); Joo Young Kim, Hwaseong-si (KR); Kyu Hwan Jo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 302 days.

(21) Appl. No.: 16/994,203

(22) Filed: Aug. 14, 2020

(65) Prior Publication Data
US 2021/0178904 A1  Jun. 17, 2021

(30) Foreign Application Priority Data

Dec. 16, 2019 (KR) .................. 10-2019-0167762

(51) Int. Cl.
*B60L 7/18* (2006.01)
*B60L 15/20* (2006.01)
*B60L 3/10* (2006.01)

(52) U.S. Cl.
CPC ............... *B60L 7/18* (2013.01); *B60L 3/108* (2013.01); *B60L 15/2009* (2013.01); *B60L 2240/423* (2013.01); *B60T 2270/602* (2013.01)

(58) Field of Classification Search
CPC ....... B60W 30/18127; B60W 30/18172; B60T 1/10; B60T 2270/602; B60L 3/108; B60L 7/18; B60L 7/26; B60L 15/2009
See application file for complete search history.

(56) References Cited

U.S. PATENT DOCUMENTS 5,378,053 A * 1/1995 Patient ................ B60W 10/184
                                                          303/3
5,450,324 A * 9/1995 Cikanek ................. B60T 13/58
                                                          303/3

(Continued)

FOREIGN PATENT DOCUMENTS

JP      2010200568 A  *  9/2010
JP      2015116000 A  *  6/2015

OTHER PUBLICATIONS

Hori, Yoichi, "Future Vehicle Driven by Electricity and Control—Research on Four-Wheel-Motored 'UOT Electric March II'", IEEE Transactions on Industrial Electronics, vol. 51 No. 5, Oct. 2004, pp. 954 to 962. (Year: 2004).*

*Primary Examiner* — David A Testardi
(74) *Attorney, Agent, or Firm* — Lempia Summerfield Katz LLC (57) ABSTRACT

An apparatus and method control regenerative braking torque of an electric vehicle on which an anti-lock brake system (ABS) is mounted. The apparatus and method can compensate the regenerative braking torque of the driving motor based on the behavior model of the electric vehicle, such that the ABS is prevented from entering an operating range to the maximum limit to maximize the energy recovery rate through regenerative braking. The apparatus includes a disturbance extractor that extracts a disturbance in a specific frequency band from a difference between a behavior model and an actual behavior of the electric vehicle. The apparatus includes a torque compensator that (Continued)

compensates for the regenerative braking torque based on the disturbance extracted by the disturbance extractor.

10 Claims, 8 Drawing Sheets

(56) References Cited

U.S. PATENT DOCUMENTS

| | | | | |
|---|---|---|---|---|
| 5,511,866 A * | 4/1996 | Terada | ............... | B60L 3/108 303/3 |
| 5,549,371 A * | 8/1996 | Konaga | ............... | B60L 50/51 303/3 |
| 5,654,887 A * | 8/1997 | Asa | ............... | B60T 8/00 180/65.285 |
| 6,122,587 A * | 9/2000 | Takahara | ............... | B60T 8/00 180/65.23 |
| 6,687,593 B1 * | 2/2004 | Crombez | ............... | B60T 1/10 180/170 |
| 10,723,229 B1 * | 7/2020 | Yao | ............... | B60L 7/10 |
| 2005/0127750 A1 * | 6/2005 | Fuhrer | ............... | B60L 7/10 903/947 |
| 2006/0017414 A1 * | 1/2006 | Joe | ............... | B60W 20/00 318/432 |
| 2006/0055239 A1 * | 3/2006 | Crombez | ............... | B60K 6/12 303/152 |
| 2006/0102394 A1 * | 5/2006 | Oliver | ............... | B60W 10/184 180/65.265 |
| 2008/0100132 A1 * | 5/2008 | Jeon | ............... | B60L 7/18 303/152 |
| 2008/0116743 A1 * | 5/2008 | Jeon | ............... | B60L 3/10 303/152 |
| 2009/0210128 A1 * | 8/2009 | Fujimoto | ............... | B60T 8/175 701/84 |
| 2012/0139330 A1 * | 6/2012 | Morishita | ............... | B60T 13/586 303/3 |
| 2013/0002176 A1 * | 1/2013 | Kim | ............... | F02N 11/04 318/460 |
| 2013/0030647 A1 * | 1/2013 | Shimasaki | ............... | B60L 7/14 701/36 |
| 2014/0095046 A1 * | 4/2014 | Nishio | ............... | B60T 8/4872 701/81 |
| 2014/0107877 A1 * | 4/2014 | Bang | ............... | B60L 15/2045 701/22 |
| 2014/0257664 A1 * | 9/2014 | Arbitmann | ............... | B60T 7/107 701/71 |
| 2014/0354034 A1 * | 12/2014 | Ozaki | ............... | B60L 7/18 301/6.5 |
| 2015/0105951 A1 * | 4/2015 | Yu | ............... | B60L 7/12 701/22 |
| 2015/0112508 A1 * | 4/2015 | Kato | ............... | B60K 28/16 701/1 |
| 2015/0180386 A1 * | 6/2015 | Enoki | ............... | H02P 6/10 318/400.23 |
| 2016/0347201 A1 * | 12/2016 | Osamura | ............... | B60L 15/2009 |
| 2016/0347202 A1 * | 12/2016 | Sawada | ............... | B60L 7/18 |
| 2017/0043677 A1 * | 2/2017 | Ko | ............... | B60L 15/20 |
| 2017/0096070 A1 * | 4/2017 | Hyun | ............... | B60L 7/26 |
| 2018/0043792 A1 * | 2/2018 | Sawada | ............... | B60L 15/20 |
| 2018/0086209 A1 * | 3/2018 | Jeon | ............... | B60T 8/17 |
| 2018/0244158 A1 * | 8/2018 | Komatsu | ............... | B60W 10/18 |
| 2021/0086623 A1 * | 3/2021 | Yao | ............... | B60W 30/18172 |
| 2021/0122341 A1 * | 4/2021 | Okumura | ............... | B60T 8/1761 |
| 2021/0221376 A1 * | 7/2021 | Shimizu | ............... | B60W 10/10 |
| 2022/0379732 A1 * | 12/2022 | Nakamura | ............... | B60L 15/2009 |

* cited by examiner

APPARATUS FOR CONTROLLING REGENERATIVE BRAKING TORQUE OF AN ELECTRIC VEHICLE AND A METHOD THEREOF

CROSS-REFERENCE TO RELATED APPLICATION

This application claims the benefit of priority to Korean Patent Application No. 10-2019-0167762, filed in the Korean Intellectual Property Office on Dec. 16, 2019, the entire contents of which are incorporated herein by reference.

TECHNICAL FIELD

The present disclosure relates to a technique of controlling regenerative braking torque of a driving motor to prevent an anti-lock brake system (ABS) provided in an electric vehicle from entering an operating range.

BACKGROUND

An anti-lock brake system (ABS) provided in a vehicle does not continuously apply a braking force to wheels when braking. An ABS performs a pumping operation periodically (e.g., 10 times or more per second) to prevent the wheels from being locked. In this case, the ABS compares the speed of a vehicle body and the speed of a wheel, and when the difference exceeds a threshold value, determines that the wheel is locked and starts operation.

The electric vehicle is equipped with a regenerative braking system that obtains energy by operating a drive motor as a generator when braking. The electric vehicle equipped with ABS cannot recover sufficient energy through regenerative braking because the regenerative braking must be stopped when ABS operates during regenerative braking.

A conventional technique of improving the energy recovery rate through regenerative braking determines a target slip amount and controls the motor to follow the target slip amount. Accordingly, it is necessary to estimate the speed of a vehicle body in order to determine the target slip amount. In addition, an additional sensor is required to estimate the speed of the vehicle body.

The matters described in this background section are intended to promote an understanding of the background of the disclosure and may include matters that are not already known to those of ordinary skill in in the art.

SUMMARY

The present disclosure has been made to solve the above-mentioned problems occurring in the prior art while advantages achieved by the prior art are maintained intact.

An aspect of the present disclosure provides an apparatus for controlling regenerative braking torque of an electric vehicle and another aspect is to provide a method thereof. The apparatus and method can compensate the regenerative braking torque of a driving motor based on a behavior model of the electric vehicle, such that an anti-lock brake system (ABS) is prevented from entering the operating range to the maximum limit to maximize the energy recovery rate through regenerative braking.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, an apparatus is disclosed for controlling regenerative braking torque of an electric vehicle on which an ABS is mounted. The apparatus includes a disturbance extractor that extracts a disturbance in a specific frequency band from a difference between a behavior model and an actual behavior of the electric vehicle. The apparatus also includes a torque compensator that compensates for the regenerative braking torque based on the disturbance extracted by the disturbance extractor.

The torque compensator may calculate compensation torque to offset the disturbance extracted by the disturbance extractor and may subtract the compensation torque from the regenerative braking torque.

The torque compensator may prevent a hysteresis phenomenon from occurring based on the calculated compensation torque.

The torque compensator may set a changing rate of the compensation torque. In this case, the torque compensator may dividedly apply the compensation torque when the regenerative braking torque is increased and may collectively apply the compensation torque when the regenerative braking torque is decreased.

The disturbance extractor may include: an inverse nominal model in a form of a transfer function, which may output torque when a wheel speed is input; a first subtractor that subtracts the compensated regenerative braking torque through proportional integral derivative (PID) control from the torque output from the inverse nominal model to extract a primary disturbance; and a filter that filters the primary disturbance extracted by the first subtractor to extract a final disturbance.

The filter may include: a first low-pass filter (LPF) that passes a first frequency component in a low frequency band; a second LPF that passes a second frequency component in the low frequency band; a second subtractor that subtracts the second frequency component from the first frequency component to extract the final disturbance; and a third LPF that removes a noise component of the final disturbance.

The torque compensator may include a compensation torque calculator that calculates a compensation torque that offsets the final disturbance extracted by the filter and a hysteresis comparator that prevents hysteresis caused by the compensation torque calculated by the compensation torque calculator The torque compensator may also include a rate limiter that equally divides the compensation torque received from the hysteresis comparator and inputs the equally divided compensation torque to a third subtractor when the regenerative braking torque is increased, and that collectively inputs the compensation torque received from the hysteresis comparator within a reference time when the regenerative braking torque is reduced. The third subtractor may be configured to subtract the compensation torque input from the rate limiter from the regenerative braking torque to compensate for the regenerative braking torque.

The torque compensator may delay an operation of the ABS until a time point at which the compensation for the regenerative braking torque is possible based on the inverse nominal model.

According to another aspect of the present disclosure, a method is disclosed of controlling regenerative braking torque of an electric vehicle on which an ABS is mounted. The method includes extracting, by a disturbance extractor, a disturbance in a specific frequency band from a difference between a behavior model and an actual behavior of the electric vehicle. The method also includes compensating, by a torque compensator, for the regenerative braking torque based on the disturbance extracted by the disturbance extractor.

The compensating for the regenerative braking torque may include calculating compensation torque to offset the disturbance extracted by the disturbance extractor. The method may also include subtracting the compensation torque from the regenerative braking torque.

The compensating for the regenerative braking torque may further include preventing a hysteresis phenomenon from occurring based on the calculated compensation torque.

The method may further include setting a changing rate of the calculated compensation torque. In this case, the setting of the changing rate of the calculated compensation torque may include dividedly applying the compensation torque when the regenerative braking torque is increased and may include collectively applying the compensation torque when the regenerative braking torque is decreased.

The extracting of the disturbance may include extracting a primary disturbance by subtracting the compensated regenerative braking torque through PID control from the torque output from an inverse nominal model and may include extracting a final disturbance by filtering the extracted primary disturbance. The extracting of the final disturbance may include: passing a first frequency component in a low frequency band; passing a second frequency component in the low frequency band; extracting the final disturbance by subtracting the second frequency component from the first frequency component; and removing a noise component of the final disturbance.

The compensating for the regenerative braking torque may include: calculating, by a compensation torque calculator, a compensation torque that offsets the final disturbance; preventing, by a hysteresis comparator, hysteresis caused by the calculated compensation torque; equally dividing, by a rate limiter, the compensation torque received from the hysteresis comparator and inputting equally divided compensation torque to a subtractor when the regenerative braking torque is increased; collectively inputting, by the rate limiter, the compensation torque received from the hysteresis comparator within a reference time to the subtractor when the regenerative braking torque is reduced; and subtracting, by the subtractor, the compensation torque input from the rate limiter from the regenerative braking torque to compensate for the regenerative braking torque.

The compensating for the regenerative braking torque may include delaying an operation of the ABS until a time point at which the compensation for the regenerative braking torque is possible based on the inverse nominal model.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. Such terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Figure 1:
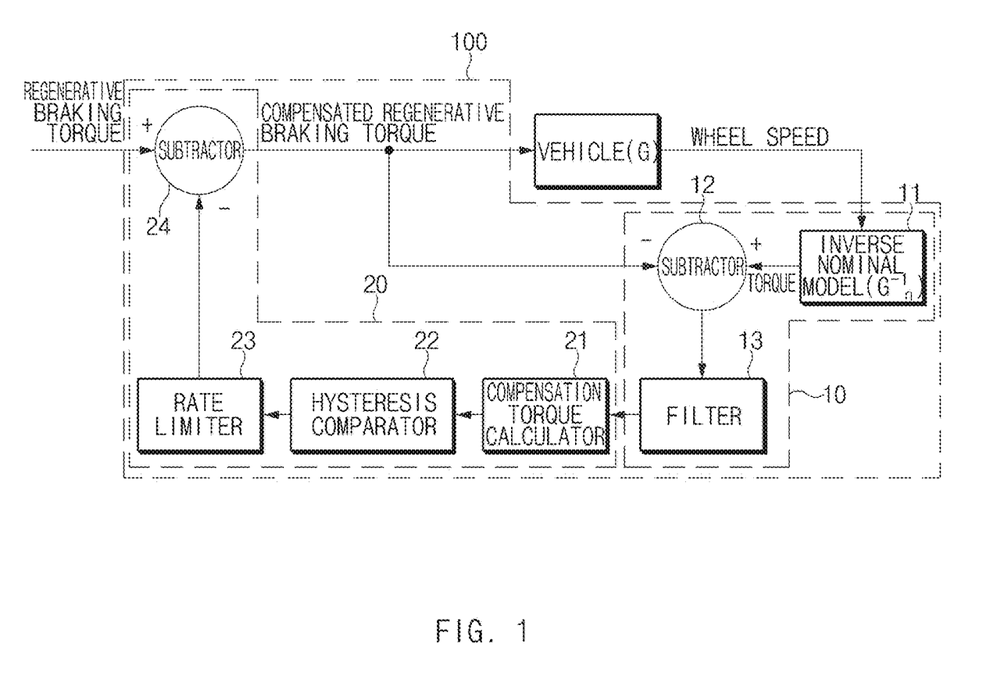
FIG. 1 is a view illustrating a configuration of an apparatus for controlling regenerative braking torque of an electric vehicle according to an embodiment of the present disclosure.

FIG. 1 is a view illustrating a configuration of an apparatus for controlling regenerative braking torque of an electric vehicle according to an embodiment of the present disclosure.

As shown in FIG. 1, an apparatus 100 for controlling regenerative braking torque of an electric vehicle according to an embodiment of the present disclosure may include a disturbance extractor 10 and a torque compensator 20. In this case, according to a scheme of implementing the apparatus 100 for controlling regenerative braking torque of an electric vehicle according to an embodiment of the present disclosure, each component may be combined with each other to be implemented as one, and some components may be omitted. In particular, the functions of the disturbance extractor 10 and the torque compensator 20 may be implemented to be performed by a controller. In this case, the controller may be implemented in the form of hardware or software, or in a combination of hardware and software. In one example, the controller may be implemented with a microprocessor, but the controller is not limited thereto.

Referring to each component, first, the disturbance extractor 10 extracts the disturbance of a specific frequency band from the difference between a behavior model and the actual behavior of the electric vehicle.

The disturbance extractor 10 may include an inverse nominal model 11, a subtractor 12, and a filter 13.

The inverse nominal model 11 may be implemented as a behavior model of an electric vehicle in the form of a transfer function ($G_n^{-1}$) that outputs torque when a wheel speed is input.

Hereinafter, the inverse nominal model 11 is described in detail with reference to FIG. 2.

Figure 2:
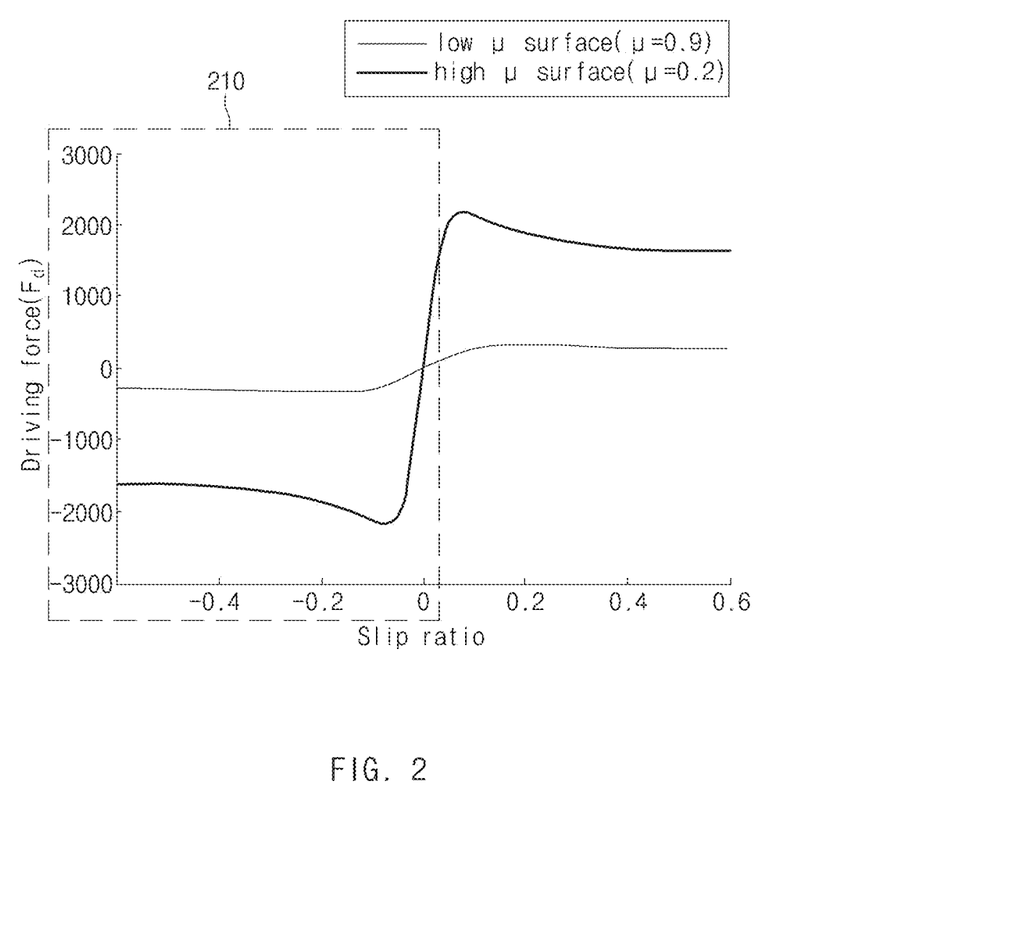
FIG. 2 is a view illustrating a relationship between a slip ratio and a braking force used to derive an inverse nominal model provided in the apparatus for controlling regenerative braking torque of an electric vehicle according to an embodiment of the present disclosure.

FIG. 2 is a view illustrating a relationship between a slip ratio and a braking force used to derive the inverse nominal model provided in the apparatus for controlling regenerative braking torque of an electric vehicle according to an embodiment of the present disclosure.

As shown in FIG. 2, reference numeral '210' indicates the relationship between the slip ratio and the braking force of the electric vehicle corresponding to the frictional forces of different road surfaces. Although there is a difference in the maximum braking force for each road surface, the maximum braking force is stably maintained in a specific slip region.

The inertia $J_{whl}$ of a wheel and the inertia $J_{eq}$ of the electric vehicle are summarized in relation to the slip ratio as in the following Equation 1.

$$J_{eq} = J_{whl} \pm mR_{eff}^2(1-\lambda) \quad \text{[Equation 1]}$$

In Equation 1, 'm' is the mass of the electric vehicle, '$R_{eff}$' is a tire dynamic radius, and 'λ' is a slip ratio, respectively. In this case, 'λ' may be expressed as in the following Equation 2.

$$\lambda(\text{slip ratio}) = \frac{R_{eff}\omega - v}{v}, R_{eff}\omega < v \quad \text{[Equation 2]}$$

In Equation 2, 'ω' represents the number of wheel revolutions and 'v' represents a vehicle speed, respectively.

Assuming that the slip ratio is 0 in Equation 1, the inertia $J_n$ of the nominal model is expressed as in the following Equation 3.

$$J_n = J_{whl} + mR_{eff}^2 \quad \text{[Equation 3]}$$

Finally, the nominal model $G_n(s)$ is expressed as in the following Equation 4.

$$G_n(s) = \frac{1}{J_n s} \quad \text{[Equation 4]}$$

Therefore, the inverse nominal model $G_n(d)^{-1}$ is expressed as in the following Equation 5.

$$G_n(d)^{-1} = J_n s \quad \text{[Equation 5]}$$

The subtractor 12 subtracts the regenerative braking torque (a regenerative braking torque value) compensated through proportional integral derivative (PID) control from the output (torque value) of the inverse nominal model. The subtraction result represents a primary disturbance.

The filter 13 extracts a final disturbance of a specific frequency band from the primary disturbance.

The filter 13 may be implemented with a low-pass filter (LPF) to extract the final disturbance from which high frequency noise is removed.

The filter 13 may be implemented with a high-pass filter (HPF) to extract the final disturbance above a specific frequency.

The filter 13 may be implemented with a band-pass filter (BPF) to extract the final disturbance of a specific frequency band.

Figure 3:
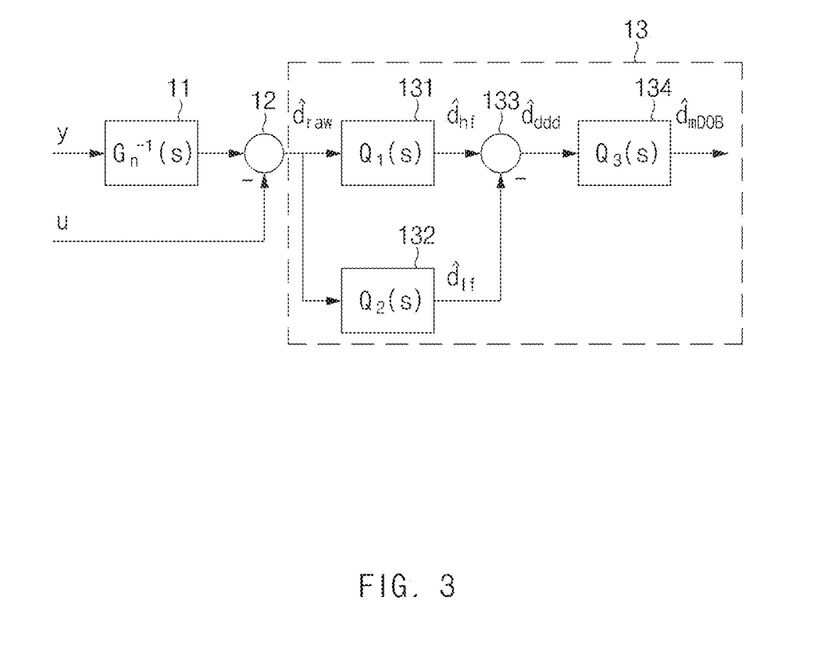
FIG. 3 is a view illustrating the structure of a filter provided in an apparatus for controlling regenerative braking torque of an electric vehicle according to an embodiment of the present disclosure.

As shown in FIG. 3, the filter 13 may be implemented with a plurality of LPFs as shown in FIG. 3.

FIG. 3 is a view illustrating the structure of a filter provided in an apparatus for controlling regenerative braking torque of an electric vehicle according to an embodiment of the present disclosure.

As shown in FIG. 3, an apparatus for controlling regenerative braking torque of an electric vehicle according to an embodiment of the present disclosure may include a plurality of LPF's. The apparatus may include: a first LPF 131 having a first time constant to pass a high-frequency component in a low frequency band; a second LPF 132 having a second time constant to pass a low-frequency component in the low frequency band; a subtractor 133 for subtracting the frequency component passing through the second LPF 132 from the frequency component passing through the first LPF 131; and a third LPF 134 for removing a noise component from the subtraction result of the subtractor 133.

The first LPF 131 filters the primary disturbance $d_{raw}$ to pass the first frequency component $\hat{d}_{hf}$. In this case, the first frequency component represents the disturbance detected when a wheel slip occurs.

The second LPF 132 filters the primary disturbance draw to pass the second frequency component $\hat{d}_{lf}$ In this case, the second frequency component represents the disturbance with respect to the gradient, load change, or change in running load.

The subtractor 133 extracts the final disturbance $\hat{d}_{add}$ by subtracting the second frequency component from the first frequency component.

The third LPF 134 removes the noise component of the final disturbance.

Figure 4:
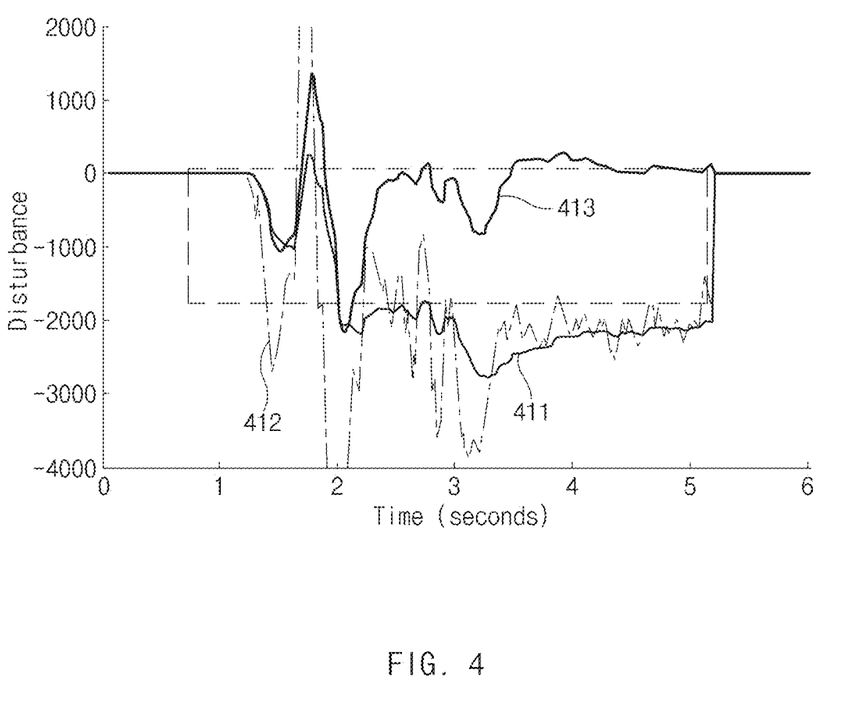
FIG. 4 is a view illustrating the output of each low-pass filter (LPF) in the filter provided in an apparatus for controlling regenerative braking torque of an electric vehicle according to an embodiment of the present disclosure.

FIG. 4 is a view illustrating the output of each LPF in the filter provided in an apparatus for controlling regenerative braking torque of an electric vehicle according to an embodiment of the present disclosure.

In FIG. 4, reference numeral 411 denotes a first frequency component as an output of the first LPF 131, reference numeral 412 denotes a second frequency component as an output of the second LPF 132, and reference numeral 413 denotes the final disturbance as an output of the third LPF 134.

Next, the torque compensator 20 compensates for the regenerative braking torque based on the disturbance extracted by the disturbance extractor 10. That is, the torque compensator calculates compensation torque (compensation torque to offset the disturbance) by which the disturbance extracted by the disturbance extractor 10 becomes 0 (zero). The torque compensator also subtracts the calculated compensation torque (compensation) from the regenerative braking torque (regenerative braking request torque).

To prevent a hysteresis phenomenon based on the calculated compensation torque, the torque compensator 20 may perform the compensation for the regenerative braking torque when the calculated compensation torque is less than a first reference value. The torque compensator 20 may not perform the compensation when the calculated compensation torque is greater than or equal to a second reference value. In this case, the first reference value is set to a value greater than the second reference value.

The torque compensator 20 may set a change ratio of the compensation torque. For example, when the compensation torque is −10 (in case of increasing the regenerative braking torque) and it is required to add 10 to the regenerative braking torque within 100 ms, it may be added by 1 in 10 ms increments instead of 10 at a time. This is to prevent shock.

As another example, when the compensation torque is 10 (in case of reducing the regenerative braking torque) and it is required to subtract 10 from the regenerative braking torque within 100 ms, the torque compensator 20 is allowed to have a fast response characteristic by subtracting 10 from the regenerative braking torque at a time.

The torque compensator 20 may include a compensation torque calculator 21, a hysteresis comparator 22, a rate limiter 23, and a subtractor 24.

The compensation torque calculator 21 calculates the compensation torque (compensation torque to offset the disturbance), which allows the final disturbance extracted by the disturbance extractor 10 to become 0 (zero).

To prevent the hysteresis phenomenon from being caused by the compensation torque calculated by the compensation torque calculator 21, the hysteresis comparator 22 transmits the calculated compensation torque to the rate limiter 23 when the compensation torque calculated by the compensation torque calculator 21 is less than the first reference value. The hysteresis compensator 22 does not transmit the calculated compensation torque to the rate limiter 23 when the compensation torque calculated by the compensation torque calculator 21 is greater than or equal to the second reference value.

In the case of increasing the regenerative braking torque, the rate limiter 23 equally divides the compensation torque received from the hysteresis comparator 22 within a reference time and inputs the equally divided compensation torque to the subtractor 24. In the case of reducing the regenerative braking torque, the rate limiter 23 collectively inputs the compensation torque received from the hysteresis comparator 22 to the subtractor 24 within the reference time.

The subtractor 24 compensates for the regenerative braking torque by subtracting the compensation torque input from the rate limiter 23 from the regenerative braking torque.

Figure 5:
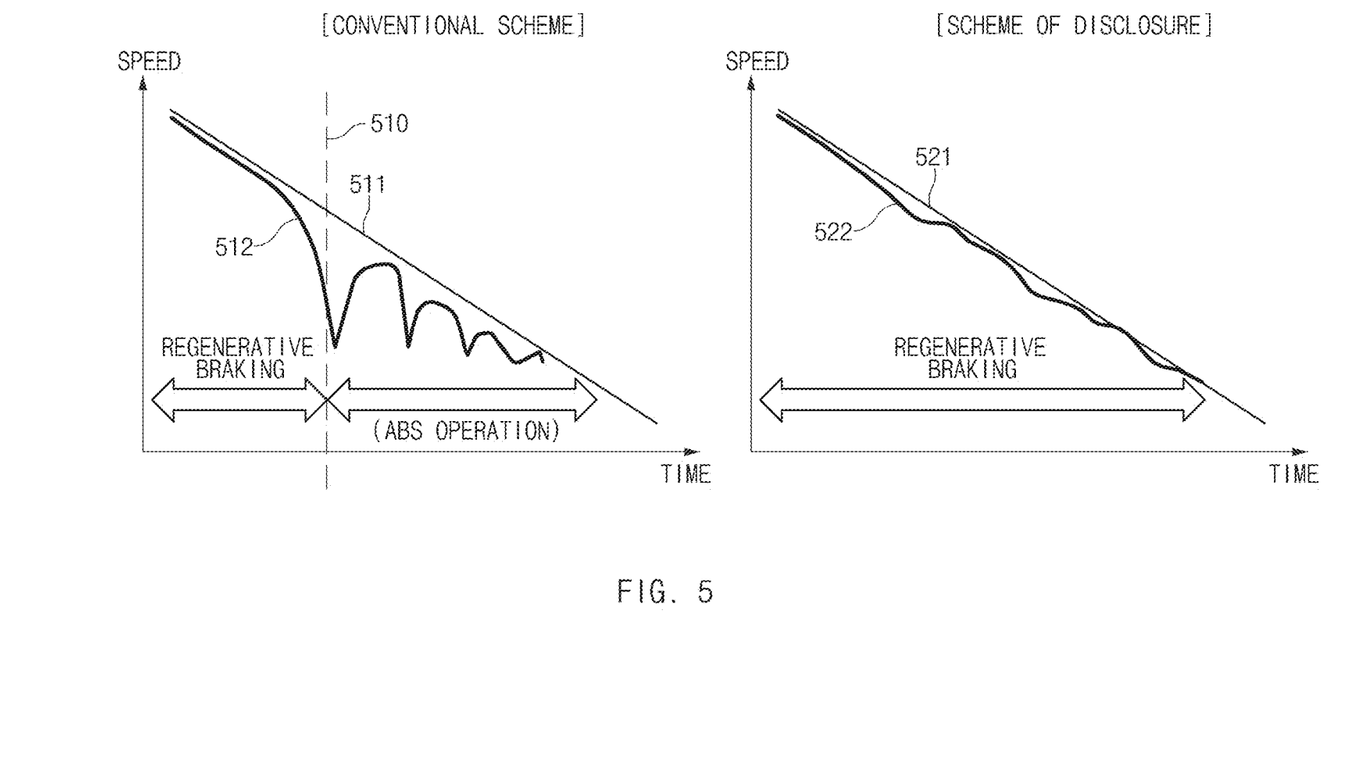
FIG. 5 is a view illustrating the performance of an apparatus for controlling regenerative braking torque of an electric vehicle according to an embodiment of the present disclosure.

FIG. 5 is a view illustrating the performance of an apparatus for controlling regenerative braking torque of an electric vehicle according to an embodiment of the present disclosure.

As shown in FIG. 5, according to the related art, it may be understood that regenerative braking is stopped by operating the ABS at a specific time point 510 because the regenerative braking torque is not controlled. In this case, the specific time point 510 is a time point at which the difference between a vehicle speed 511 and a wheel speed 512 exceeds a threshold.

To the contrary, according to a scheme of the present disclosure, because the regenerative braking torque is controlled, the operation of the ABS may be prevented or delayed as much as possible to extend the regenerative braking time. That is, when it is possible to continuously compensate for the regenerative braking torque based on the inverse nominal model or the nominal model, the operation of the ABS may be completely prevented. In addition, it is possible to delay the operation of the ABS until the time point at which it is possible to compensate for the regenerative braking torque based on the inverse nominal model or the nominal model.

Figure 6:
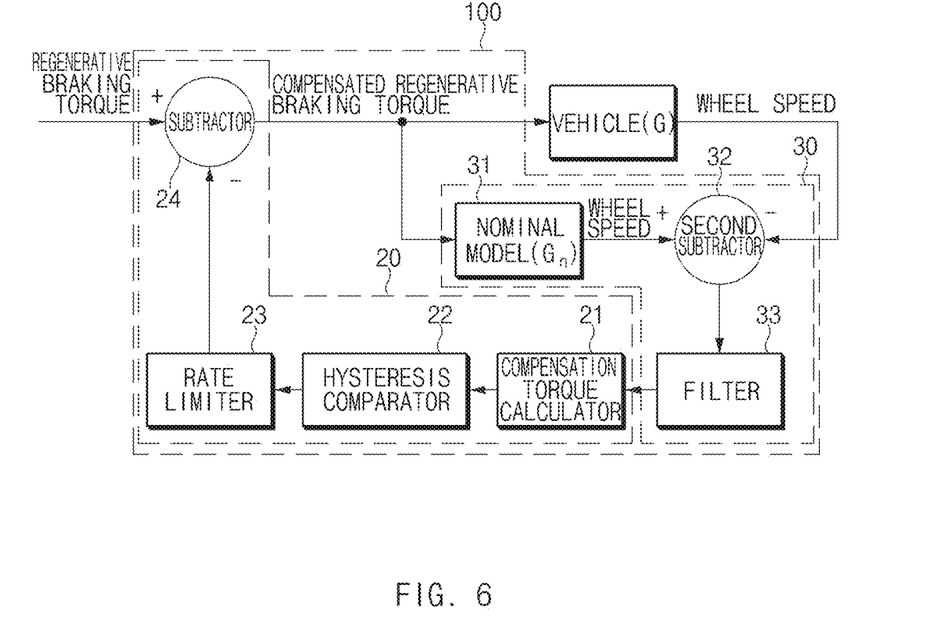
FIG. 6 is a view illustrating a configuration of an apparatus for controlling regenerative braking torque of an electric vehicle according to another embodiment of the present disclosure.

FIG. 6 is a view illustrating a configuration of an apparatus for controlling regenerative braking torque of an electric vehicle according to another embodiment of the present disclosure. In this embodiment, the structure of the torque compensator 20 is the same as that of FIG. 1.

As shown in FIG. 6, a disturbance extractor 30 extracts the disturbance of a specific frequency band from the difference between the behavior model and the actual behavior of the electric vehicle.

The disturbance extractor 30 may include a nominal model 31, a subtractor 32, and a filter 33.

The nominal model 31 may be implemented in the form of a transfer function $G_n$ that outputs a wheel speed when torque is input as a behavior model of an electric vehicle.

The subtractor 32 performs an operation of subtracting the wheel speed of the vehicle from the output (wheel speed) of the nominal model. The calculation result represents the primary disturbance.

The filter 33 extracts the final disturbance of a specific frequency band from the primary disturbance.

Figure 7:
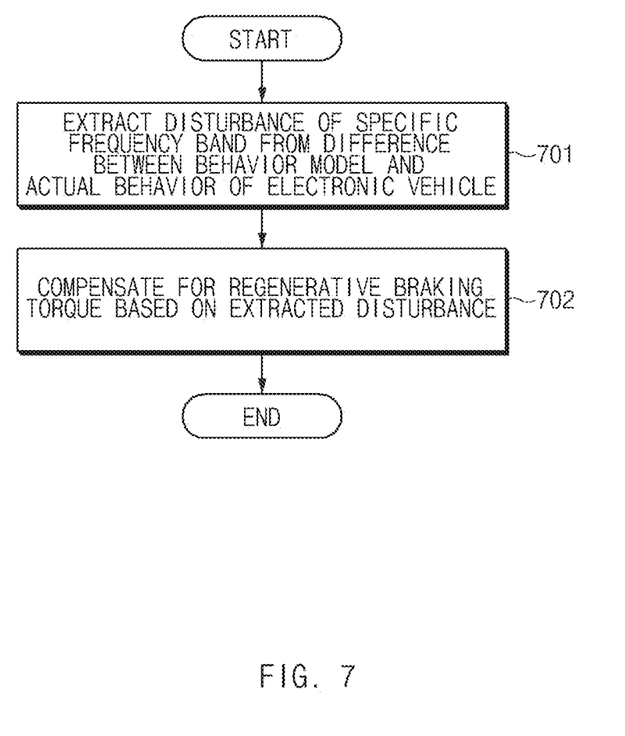
FIG. 7 is a flowchart illustrating a method of controlling regenerative braking torque of an electric vehicle according to an embodiment of the present disclosure.

FIG. 7 is a flowchart illustrating a method of controlling regenerative braking torque of an electric vehicle according to an embodiment of the present disclosure.

First, in operation 701, the disturbance extractor 10 extracts the disturbance (torque) of a specific frequency band from the difference between the behavior model and the actual behavior of the electric vehicle.

Thereafter, in operation 702, the torque compensator 20 compensates for the regenerative braking torque based on the disturbance extracted by the disturbance extractor 10.

Figure 8:
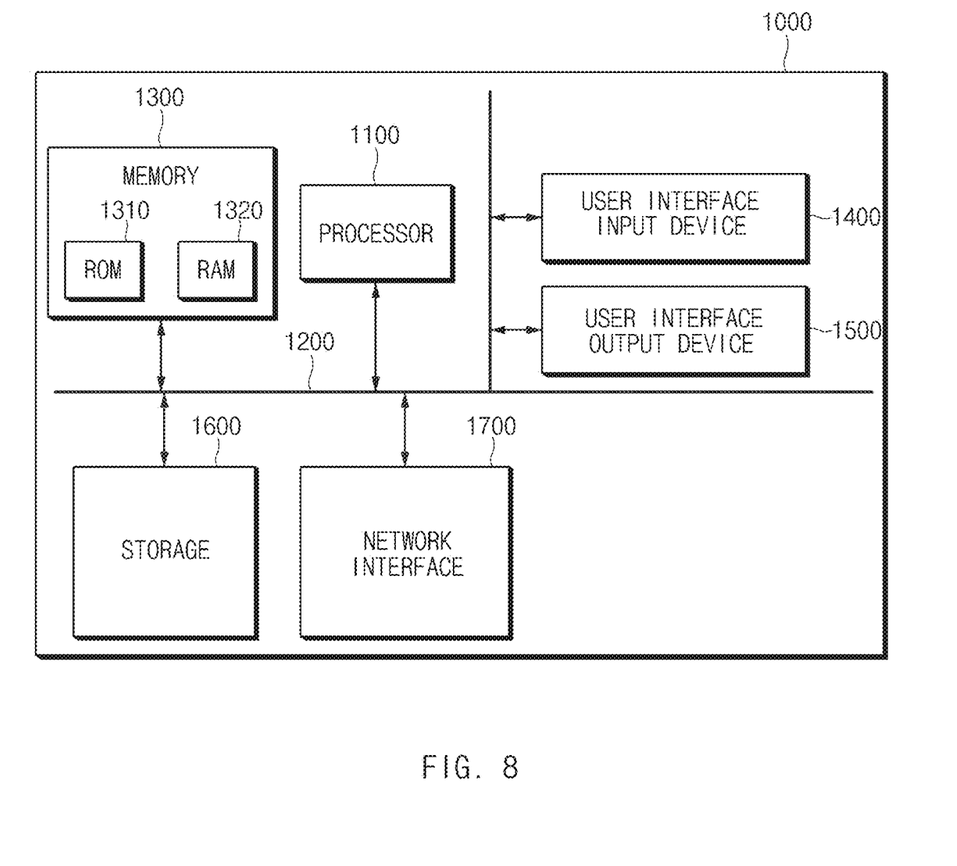
FIG. 8 is a block diagram illustrating a computing system for executing a method of controlling regenerative braking torque of an electric vehicle according to an embodiment of the present disclosure.

FIG. 8 is a block diagram illustrating a computing system for executing a method of controlling regenerative braking torque of an electric vehicle according to an embodiment of the present disclosure.

Referring to FIG. 8, as described above, a method of controlling regenerative braking torque of an electric vehicle according to an embodiment of the present disclosure may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM. The disclosed storage medium in this example is coupled to the processor 1100. The processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the apparatus and method for controlling regenerative braking torque of an electric vehicle can compensate the regenerative braking torque of the driving motor based on the behavior model of the electric vehicle. Thus, an ABS is prevented from entering the operating range to the maximum limit to maximize the energy recovery rate through regenerative braking.

The above description is an exemplification of the technical spirit of the present disclosure. The present disclosure may be variously altered and modified by those having ordinary skill in the art to which the present disclosure pertains without departing from the essential features of the present disclosure.

Therefore, the disclosed embodiments of the present disclosure do not limit the technical spirit of the present disclosure but instead are illustrative. The scope of the technical spirit of the present disclosure is not limited by the disclosed embodiments. The scope of the present disclosure should be construed by the claims, and it should be understood that all the technical spirits within the equivalent range fall within the scope of the present disclosure.

What is claimed is:

1. An apparatus for controlling a regenerative braking torque of an electric vehicle on which an anti-lock brake system (ABS) is mounted, the apparatus comprising:
a processor; and
a non-transitory storage medium containing program instructions that, when executed by the processor, causes the apparatus to implement
a disturbance extractor to extract a disturbance in a specific frequency band from a difference between a torque output based on a model behavior represented by an inverse nominal model in a form of a transfer function that outputs the torque when a wheel speed is input, and the regenerative braking torque based on an actual behavior of the electric vehicle while moving, and
a torque compensator to compensate for the regenerative braking torque based on the disturbance extracted by the disturbance extractor to prevent an operation of the ABS while the electric vehicle is moving to maximize an energy recovery rate by a motor of the electric vehicle via regenerative braking by calculating a compensation torque to offset the disturbance extracted by the disturbance extractor, and subtracting the compensation torque from the regenerative braking torque,
wherein the program instructions, when executed by the processor, further cause the torque compensator to set a changing rate of the compensation torque, and
wherein the changing rate of the compensation torque is set by
equally dividing and applying the compensation torque by increments within a reference time when the regenerative braking torque is increased, and
applying all of the compensation torque within the reference time when the regenerative braking torque is decreased.

2. The apparatus of claim 1, wherein the program instructions, when executed by the processor, cause the disturbance extractor to include:
a first subtractor to subtract a compensated regenerative braking torque, obtained by subtracting the compensation torque from the regenerative braking torque, from the torque output corresponding to the wheel speed based on the inverse nominal model in the form of the transfer function to extract a primary disturbance; and
a filter to filter the primary disturbance extracted by the first subtractor to extract a final disturbance.

3. The apparatus of claim 2, wherein the program instructions, when executed by the processor, cause the filter to include:
a first low-pass filter (LPF) having a first time constant to filter the primary disturbance and output a high-frequency component in a low frequency band;
a second LPF having a second time constant to filter the primary disturbance and output a low-frequency component in the low frequency band;
a second subtractor to subtract the low-frequency component from the high-frequency component to extract the final disturbance; and
a third LPF to remove a noise component of the final disturbance.

4. The apparatus of claim 2, wherein the program instructions, when executed by the processor, cause the apparatus to implement:
a compensation torque calculator to calculate the compensation torque that offsets the final disturbance extracted by the filter; and
a rate limiter to
equally divide the compensation torque by increments within a reference time and input the equally divided compensation torque when the regenerative braking torque is increased, and
input all of the compensation torque within the reference time when the regenerative braking torque is reduced,
wherein a third subtractor subtracts the compensation torque from the regenerative braking torque to compensate for the regenerative braking torque.

5. The apparatus of claim 2, wherein the program instructions, when executed by the processor, cause the torque compensator to delay the operation of the ABS when the compensation for the regenerative braking torque is possible based on the inverse nominal model.

6. A method of controlling regenerative braking torque of an electric vehicle on which an anti-lock brake system (ABS) is mounted, the method comprising:
extracting, by a disturbance extractor implemented by a processor, a disturbance in a specific frequency band from a difference between a torque output based on a model behavior of the electric vehicle represented by an inverse nominal model in a form of a transfer function that outputs the torque when a wheel speed is input, and a regenerative braking torque based on an actual behavior of the electric vehicle while moving; and
compensating, by a torque compensator implemented by the processor, for the regenerative braking torque based on the disturbance to prevent the ABS from operating while the electric vehicle is moving to maximize an energy recovery rate by a motor of the electric vehicle via regenerative braking,
wherein the compensating for the regenerative braking torque includes
calculating a compensation torque to offset the disturbance, and
subtracting the compensation torque from the regenerative braking torque,
wherein the method further includes setting a changing rate of the calculated compensation torque, and wherein the setting of the changing rate of the calculated compensation torque includes
equally dividing and applying the compensation torque by increments within a reference time when the regenerative braking torque is increased, and
applying all of the compensation torque within the reference time when the regenerative braking torque is decreased.

7. The method of claim 6, wherein the extracting of the disturbance includes:
extracting a primary disturbance by subtracting a compensated regenerative braking torque, obtained by subtracting the compensation torque from the regenerative braking torque, from the torque output corresponding to the wheel speed based on the inverse nominal model in the form of a transfer function; and
extracting a final disturbance by filtering the primary disturbance.

8. The method of claim 7, wherein the extracting of the final disturbance includes:
filtering the primary disturbance and outputting a high-frequency component in a low frequency band;
filtering the primary disturbance and outputting a low-frequency component in the low frequency band;
subtracting the low-frequency component from the high-frequency component to extract the final disturbance; and
removing a noise component of the final disturbance.

9. The method of claim 7, wherein the compensating for the regenerative braking torque includes:
calculating, by a compensation torque calculator implemented by the processor, the compensation torque that offsets the final disturbance;
equally dividing, by a rate limiter implemented by the processor, the compensation torque and inputting the equally divided compensation torque by increments within a time reference to a subtractor implemented by the processor, when the regenerative braking torque is increased;
inputting, by the rate limiter, all of the compensation torque within a reference time to the subtractor when the regenerative braking torque is reduced; and
subtracting, by the subtractor, the compensation torque input from the rate limiter from the regenerative braking torque to compensate for the regenerative braking torque.

10. The method of claim 7, wherein the compensating for the regenerative braking torque includes:
delaying an operation of the ABS when the compensation for the regenerative braking torque is possible based on the inverse nominal model.

* * * * *